United States Patent [19]

DeGeorge

[11] Patent Number: 5,806,485
[45] Date of Patent: Sep. 15, 1998

[54] METHOD OF ADAPTIVE AIR CONDITIONING COMPENSATION

[75] Inventor: John W. DeGeorge, Michigan Center, Mich.

[73] Assignee: Chrysler Corporation

[21] Appl. No.: 920,909

[22] Filed: Aug. 29, 1997

Related U.S. Application Data

[63] Continuation of Ser. No. 789,321, Jan. 23, 1997, abandoned.

[51] Int. Cl.$^6$ .............................. F02M 3/00; F25B 27/00
[52] U.S. Cl. ...................................... 123/339.17; 62/323.1
[58] Field of Search ..................... 123/339.17; 62/133, 62/228.4, 323.1, 323.4

[56] References Cited

U.S. PATENT DOCUMENTS

| | | | |
|---|---|---|---|
| 4,444,168 | 4/1984 | Matsumura et al. | 123/339 |
| 4,510,764 | 4/1985 | Suzuki | 62/133 |
| 4,592,321 | 6/1986 | Schulz | 123/339 |
| 4,642,770 | 2/1987 | Shirley | 364/424 |
| 4,914,924 | 4/1990 | Takahashi | 62/133 |
| 4,969,334 | 11/1990 | Goubeaux et al. | 62/133 |
| 5,018,362 | 5/1991 | Nagase et al. | 62/133 |
| 5,022,232 | 6/1991 | Sakamoto et al. | 62/133 |
| 5,163,399 | 11/1992 | Bolander et al. | 123/339 |
| 5,199,272 | 4/1993 | Yamanaka et al. | 62/133 |
| 5,216,895 | 6/1993 | Kawai et al. | 62/133 |
| 5,235,947 | 8/1993 | Watanabe | 123/339 |
| 5,249,559 | 10/1993 | Weber et al. | 123/339 |
| 5,257,507 | 11/1993 | Taguchi | 62/133 |
| 5,349,826 | 9/1994 | Kawai et al. | 62/133 |
| 5,385,029 | 1/1995 | Yamanaka et al. | 62/133 |
| 5,517,964 | 5/1996 | Chen et al. | 123/339.11 |

*Primary Examiner*—Andrew M. Dolinar
*Assistant Examiner*—Hieu T. Vo
*Attorney, Agent, or Firm*—Roland A. Fuller, III

[57] ABSTRACT

A method of air conditioning compensation is disclosed for a motor vehicle having an air conditioning (AC) system with a compressor, an automatic idle speed (AIS) compensation mechanism having an AIS position and an engine control mechanism. The method includes the steps of comparing a head pressure on the compressor to a predetermined continuous curve of relative AIS position and identifying a first point on the curve of relative AIS position associated with the head pressure. The method also includes the steps of identifying a second point and a third point on the curve of relative AIS position that the first point is between and weighting the second point with respect to the first point and weighting the third point with respect to the first point. The method further includes the steps of interpolating the curve of relative AIS position using the weighted second point and the weighted third point to obtain a weighted relative AIS position, and determining if the weighted relative AIS position is equal to an AIS position target. The method still further includes the steps of updating the second point and the third point on the curve of relative AIS position if the weighted relative AIS position is not equal to an AIS position target and adjusting the AIS control mechanism when called for by the engine control mechanism.

7 Claims, 2 Drawing Sheets

METHOD OF ADAPTIVE AIR CONDITIONING COMPENSATION

CROSS-REFERENCE TO RELATED APPLICATION

This application is a Continuation of application Ser. No. 08/789,321, filed Jan. 23, 1997, now abandoned.

BACKGROUND OF THE INVENTION

1. Field of the Invention

The present invention relates generally to air conditioning systems in vehicles and, more particularly, to a method of adaptive air conditioning compensation for a motor vehicle.

2. Description of the Related Art

Air conditioning is a popular feature on many motor vehicles. The primary components of an air conditioning system include a compressor, a clutch and a cooling fan. It is well known that the engagement or disengagement of the air conditioning system affects the power output of an engine in a motor vehicle, resulting in a variation in engine speed, particularly at idle. In order to maintain a constant idle speed, many engines include an auxiliary mechanism, such as a moveable throttle stop for controlling the throttle or an air bypass valve for controlling airflow into the engine. An example of an air bypass valve, also referred to as an automatic idle speed (AIS) motor, is disclosed in commonly assigned U.S. Pat. No. 4,452,201, "Automatic Idle Speed Actuator Valve."

An example of air conditioning compensation found in the art is for the AIS motor to increase or decrease an auxiliary airflow a fixed amount when the air conditioning system is engaged or disengaged, respectively. An inherent disadvantage with this method is that the compressor's head pressure is directly related to ambient temperature, resulting in engine speed undershoot at higher ambient temperature due to increased loads and corresponding overshoots at lower ambient temperature.

Another example of air conditioning compensation is disclosed in commonly assigned U.S. Pat. No. 5,249,559 to Weber et al. entitled "Method for Idle Speed Compensation Due to Air Conditioner Operation." This patented air conditioning compensation methodology recognizes the direct relationship between ambient temperature and pressure in the compressor, and utilizes this relationship and adaptive learning to determine an amount of auxiliary airflow required to maintain a consistent idle speed at varying ambient temperatures. Adaptive learning is a well-known process in the art whereby a predetermined initial value is stored in a memory portion of an electronic controller. During vehicle operation, this value is updated to reflect an actual engine operating condition, thus establishing a new value for use when that particular operating condition recurs.

A further example of air conditioning compensation is based on air conditioning compressor head pressure. Head pressure directly correlates with engine load. The overall potential range of head pressure values is divided into cells, such as seven. Each cell correlates with a learned value for modifying the auxiliary airflow when the air conditioning system is engaged or disengaged. Although this method worked well, it suffers from the disadvantage that a mismatch can occur between the cell range and the learned value for modifying auxiliary air flow. For example, if the air conditioning system is engaged and the head pressure is within cell two (having a relative auxiliary airflow position of 9), learning will not occur until cell three (having a relative auxiliary air flow of 27), because of an inherent two to three second delay for the engine to stabilize before learning can take place. Meanwhile, head pressure is increasing, resulting in an engine idle speed undershoot until the system is able to catch up. Conversely, engine idle speed overshoot can occur if a lower cell has a larger relative auxiliary air flow value than a higher cell, and the air conditioning system is engaged on the lower cell and adaptive learning occurs on the higher cell. Therefore, there is a need in the art for a method of air conditioning compensation that effectively maintains engine idle speed during the engagement or disengagement of the air conditioning system.

SUMMARY OF THE INVENTION

It is, therefore, one object of the present invention to provide a method of air conditioning compensation for an engine in a motor vehicle.

It is another object of the present invention to provide a method of air conditioning compensation that adaptively adjusts a continuous curve corresponding to an auxiliary airflow adjustment for an engine in a motor vehicle.

It is yet another object of the present invention to provide a method of air conditioning compensation that reduces engine idle speed fluctuation during the engagement or disengagement of the air conditioning system for an engine in a motor vehicle.

To achieve the foregoing objects, the present invention is a method of air conditioning compensation for a motor vehicle having an air conditioning system with a compressor, an automatic idle speed (AIS) compensation mechanism having an AIS position, and an engine control mechanism. The method includes the steps of comparing a head pressure on the air conditioning compressor to a predetermined continuous curve of relative AIS position and identifying a first point on the curve of relative AIS position associated with the head pressure. The method also includes the steps of identifying a second point and a third point on the curve of relative AIS position that the first point is between and weighting the second point with respect to the first point and weighting the third point with respect to the first point. The method further includes the steps of interpolating the curve of relative AIS position using the weighted second point and the weighted third point to obtain a weighted relative AIS position, and determining if the weighted relative AIS position is equal to an AIS position target. The method still further includes the steps of updating the second point and the third point on the curve of relative AIS position if the weighted relative AIS position is not equal to an AIS position target and adjusting the AIS control mechanism when called for by the engine control mechanism.

One advantage of the present invention is that a new and improved method of air conditioning compensation is provided for an internal combustion engine in a motor vehicle. Another advantage of the present invention is that a method of air conditioning compensation is provided that utilizes adaptive learning to more reliably update a continuous curve corresponding to a relative AIS motor position. A further advantage of the present invention is that a method of air conditioning compensation is provided that more accurately modifies auxiliary airflow into an engine so that engine idle speed is maintained during the engagement or disengagement of the air conditioning system.

Other objects, features and advantages of the present invention will be readily appreciated as the same becomes

DESCRIPTION OF THE PREFERRED EMBODIMENT(S)

Figure 1:
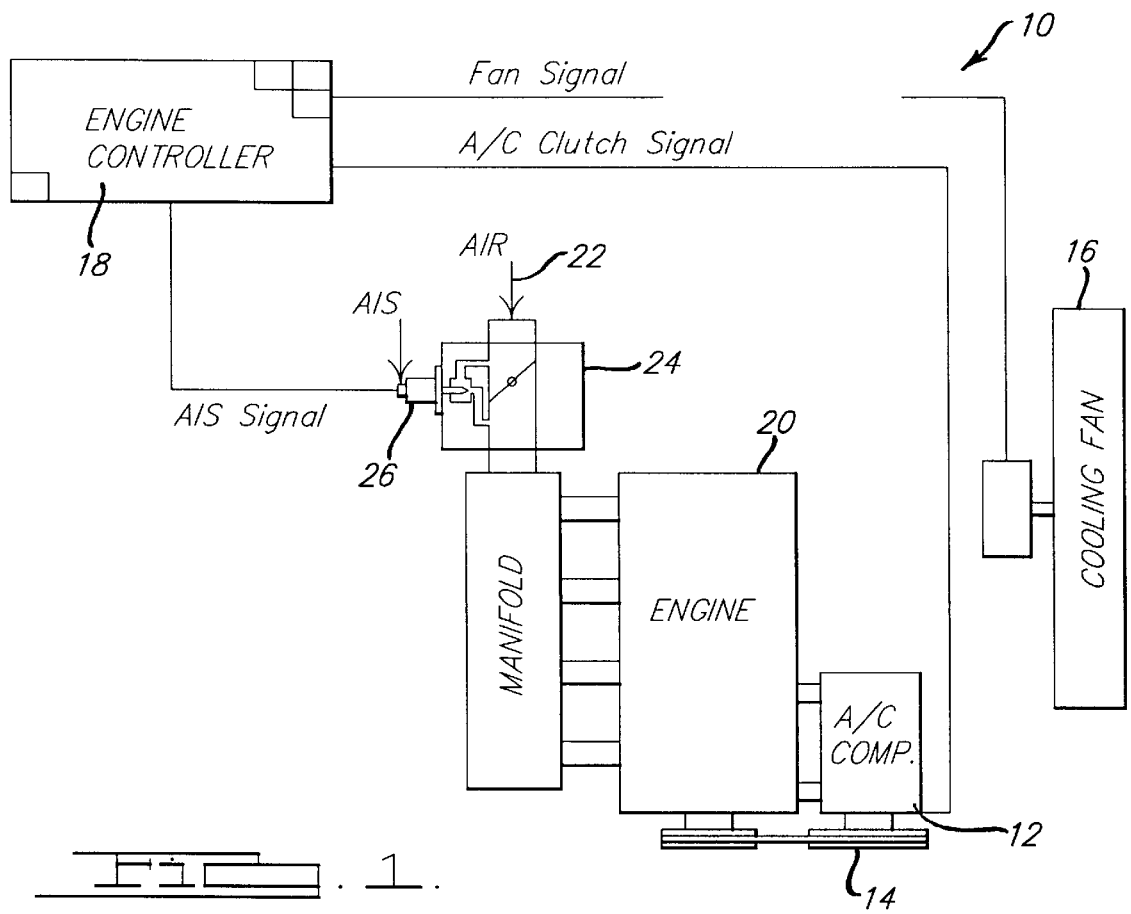
FIG. 1 is a block diagram of an air conditioning system for a motor vehicle.

Referring to FIG. 1, an air conditioning system 10 is illustrated schematically for a motor vehicle (not shown). The air conditioning system 10 includes a compressor 12 operatively connected to a clutch 14. The compressor 12 is also operatively connected to an engine 20. It should be appreciated that the engine 20 in this example is an internal combustion engine capable of operating on a mixture of fuel (not shown) and air 22. The fuel and air 22 enter the engine 20 through a fuel actuating mechanism 24, such as a throttle body, which meters the amount of fuel and air 22 entering the engine 20.

The air conditioning system 10 includes an engine control mechanism such as an engine controller 18, in communication with the engine 20. It should be appreciated that the engine controller 18 is also in communication with the compressor 12 and a cooling fan 16.

An air bypass actuator 26 is operably connected to the fuel actuating mechanism 24. The air bypass actuator 26 directs a flow of auxiliary air into the fuel actuating mechanism 24, in response to a signal from the engine controller 18. An increase or decrease in auxiliary air regulates the speed of the engine 20 to compensate for fluctuations in engine speed. Engine speed variability is especially apparent to the vehicle operator. For example, engagement or disengagement of the compressor 12 while the engine 20 is at idle increases or decreases, respectively, the load on the engine 20, resulting in a corresponding variation in engine speed.

Preferably, the air bypass actuator is an automatic idle speed (AIS) motor 26, commonly referred to as an AIS motor. The AIS motor 26 includes an actuator valve and a motor to drive the valve (not shown, but well known in the art). It should be appreciated that the motor in this example is of a type well known in the art, such as a Stepper motor. The operational position of the valve, from fully closed to fully open, is expressed as a percentage of valve opening ranging from zero to one hundred percent. The percentage of valve opening can be further divided into a predetermined number of discrete steps. Thus, each step correlates with a discrete change in airflow resulting from the movement of the actuator valve. An AIS kick refers to the number of steps the AIS motor 26 takes to move the valve to a new valve position. It should be appreciated that in this example a table containing AIS kick values is stored in a memory location in the engine controller 18.

Preferably, the engine 20 also includes various other sensing mechanisms or sensors to carry out its functions, such as a throttle position sensor (not shown) and a manifold Absolute Pressure (MAP) sensor (not shown), which are conventional and well known in the art. The outputs of these sensors also communicate with the engine controller 18. It should be appreciated that the air conditioning system 10 also includes other hardware (not shown, but conventional in the art) to carry out the method to be described.

Figure 3:
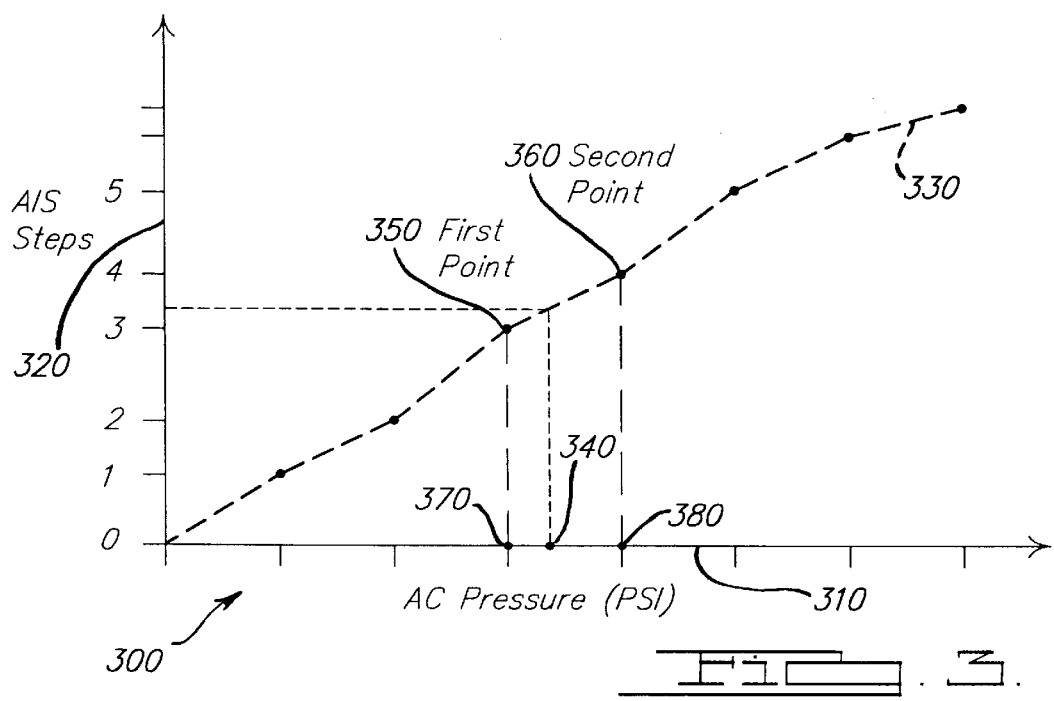
FIG. 3 is a graph of AC head pressure versus AIS steps according to the present invention.
Figure 2:
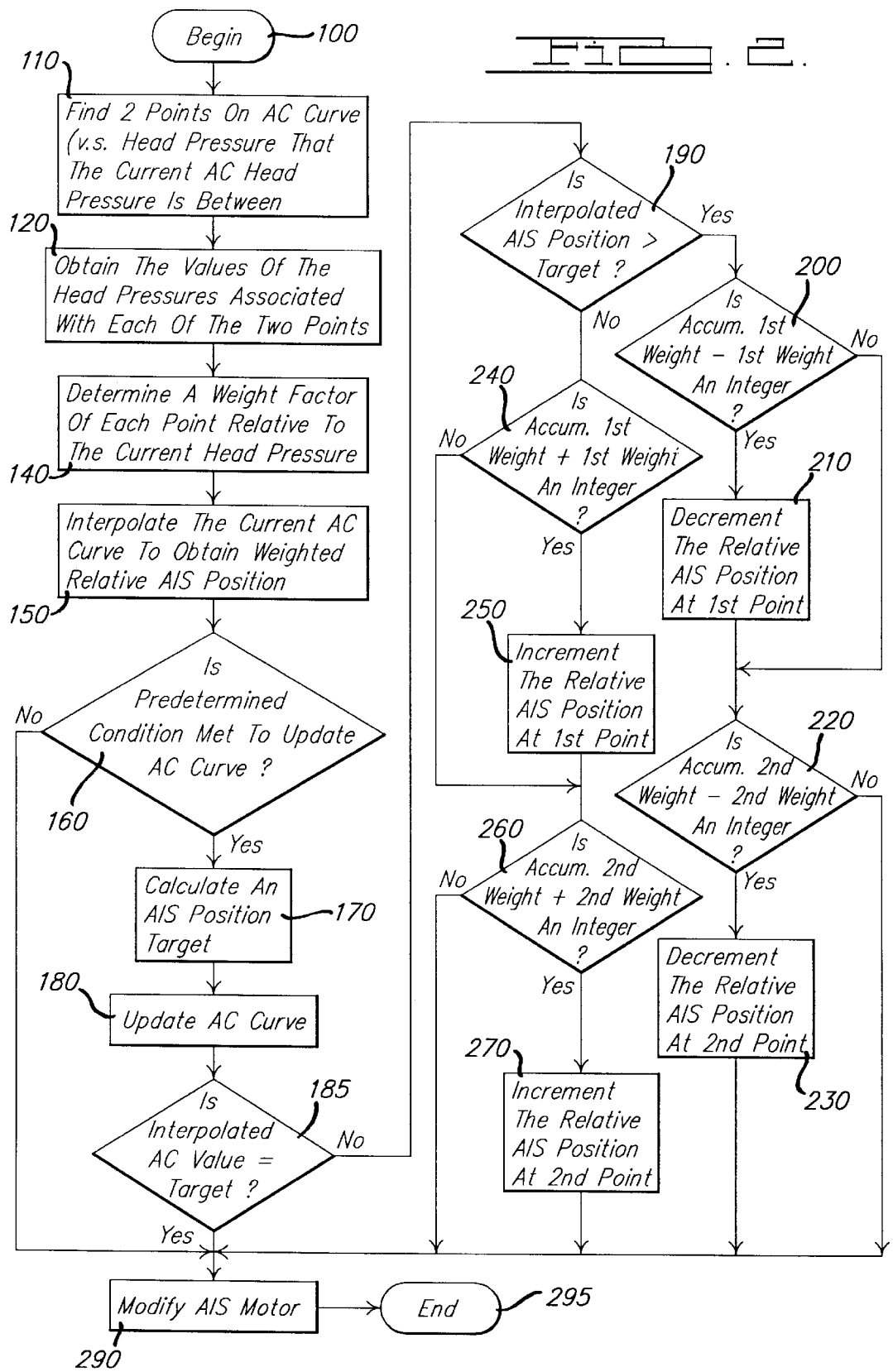
FIG. 2 is a flowchart of a method of air conditioning compensation, according to the present invention, for the air conditioning system of FIG. 1.

Referring to FIGS. 2 and 3, a method of air conditioning compensation, according to the present invention, is illustrated. The methodology begins in bubble 100, when it is called for from an engine control program stored in the engine controller 18. The methodology utilizes a predetermined continuous curve of relative AIS position 300 that includes an x-axis representing air conditioning compressor head pressure 310, a y-axis representing an AIS step 320, and a curve representing relative AIS position 330. For example, the current AC head pressure 340 is the head pressure on the compressor 12. Relative AIS position is calculated by taking a difference between a current AIS position and an AIS position without the air conditioning engaged. Preferably, the curve of relative AIS position 330 is adaptively learned (to be described).

The methodology advances to block 110 and compares the current AC head pressure 340 to the curve of relative AIS position 330 to determine a discrete first point of relative AIS position 350 and a discrete second point of relative AIS position 360 that the current AC head pressure 340 is between.

The methodology advances to block 120, and uses the predetermined curve of relative AIS position 300 to determine a first value of head pressure 370 associated with the discrete first point 350 and a second value of head pressure 380 associated with the discrete second point 360. It should be appreciated that in this example the first value of head pressure 370 and second value of head pressure 380 are stored in a memory location within the engine controller 18 until called for.

The methodology advances to block 140 and compares the current head pressure 340 to the first value of head pressure 370 and the second value of head pressure 380 to determine the current head pressure's 340 relative weighted position between the first value 370 and second value 380 of head pressure. The methodology determines a first weight associated with the first value of head pressure 370 and a second weight associated with the second value of head pressure 380.

For example, if the current AC head pressure 340 is 200 psi, and from the curve of relative AIS position 330 the first value of head pressure 370 is 175 psi and the second value of head pressure 380 is 250 psi, the first weight accounts for 67% of the current AC head pressure, or 0.67 and the second weight accounts for 33% of the current AC head pressure or 0.33. The second weight can be expressed as the current head pressure 340 minus the first value of head pressure 370, divided by the absolute value of the first value of head pressure 370 minus the second value of head pressure 380. The first weight can be expressed as one minus the second weight.

The methodology advances to block 150 and determines a weighted relative AIS position by interpolating the curve of relative AIS position 330. For example, the weighted relative AIS position equals the first weight multiplied by the discrete first point 350 plus the second weight multiplied by the discrete second point 360. If the discrete first point 350 is 18 and the discrete second point 360 is 24, the weighted relative AIS position is equal to (0.67 * 18)+(0.33 * 24)=20.

The methodology advances to diamond 160 and determines if a predetermined condition is met for the curve of relative AIS position 330 to be updated. If the predetermined condition is not met for the curve of relative AIS position 330 to be updated, the methodology advances to block 290, to be described. An example of a predetermined condition is if an engine coolant temperature has reached a predetermined temperature.

If a predetermined condition is met for the curve of relative AIS position 330 to be updated, the methodology advances to block 170. In block 170, the methodology determines an AIS position target, such as by calculating the difference between the current relative AIS position with air conditioning ON and an AIS position with the air conditioning OFF. The methodology advances to block 180.

In block 180, the methodology begins to adaptively update the continuous curve of relative AIS position 330 and continues to diamond 185. In diamond 185, the methodology determines if the weighted relative AIS position is equal to the AIS position target. If the weighted relative AIS position is equal to the AIS position target, the methodology advances to block 290 to be described and does not continue updating the curve of relative AIS position 330.

If the weighted relative AIS position is not equal to the AIS position target, the methodology advances to block 190 and determines if the weighted relative AIS position is greater than the AIS position target. If the weighted relative AIS position is greater than the AIS position target, the methodology advances to diamond 200 and determines a new accumulated second weight by subtracting a first weight from an accumulated first weight and determining if a rollover has occurred in a new accumulated first weight. For example, a rollover occurs if the new accumulated first weight exceeds a whole number, such as an integer. If a rollover has occurred, the methodology advances to block 210. In block 210, the methodology decrements the relative AIS position at the first point 350. The methodology advances to diamond 220 to be described. Returning to diamond 200, if a rollover did not occur, the methodology advances to diamond 220.

In diamond 220, the methodology determines a new accumulated second weight by subtracting a second weight from an accumulated second weight and determines if a rollover has occurred in the new accumulated second weight. If a rollover has not occurred, the methodology advances to block 290 to be described. If a rollover has occurred, the methodology advances to block 230. In block 230, the methodology decrements the relative AIS position at the second point 360. The methodology advances to block 290 to be described.

Returning to diamond 190, if the weighted relative AIS position is not greater than the AIS position target, the methodology advances to diamond 240 and determines a new accumulated first weight by adding an accumulated first weight to a first weight and then determining if a rollover has occurred. If a rollover has not occurred, the methodology advances to diamond 260. If a rollover has occurred, the methodology advances to block 250. In block 250, the methodology increments the relative AIS position at the first point 350 and advances to diamond 260.

In diamond 260, the methodology determines a new accumulated second weight by adding an accumulated second weight to a second weight and determines if a rollover has occurred in the new accumulated second weight. If a rollover has not occurred, the methodology advances to block 290 to be described. If a rollover has occurred, the methodology advances to block 270. In block 270, the methodology increments the relative AIS position at the second point 360. The methodology advances to block 290.

In block 290, the methodology adjusts the AIS motor 26 based upon the weighted relative AIS position when called for by the engine controller 18. The methodology advances to block 295 and returns.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of air conditioning compensation for a motor vehicle having an air conditioning (AC) system with a compressor, an automatic idle speed (AIS) compensation mechanism having an AIS position, and an engine control mechanism, said method comprising the steps of:

comparing a head pressure on the compressor to a predetermined curve of relative AIS position and identifying a first point on the curve of relative AIS position associated with the head pressure;

identifying a second point and a third point on the curve of relative AIS position that the first point is between;

weighting the second point with respect to the first point and weighting the third point with respect to the first point;

interpolating the curve of relative AIS position using the weighted second point and the weighted third point to obtain a weighted relative AIS position;

determining if the weighted relative AIS position is equal to an AIS position target;

updating the second point and the third point on the curve of relative AIS position if the weighted relative AIS position is not equal to an AIS position target; and adjusting the AIS compensation mechanism based upon the weighted relative AIS position when called for by the engine control mechanism.

2. A method as forth in claim 1 including the step of not updating the curve of relative AIS position if the weighted relative AIS position is equal to the AIS position target, prior to said step of updating.

3. A method as set forth in claim 1 wherein the curve of relative AIS position is adaptively updated.

4. A method as set forth in claim 1 wherein the relative AIS position is a difference between a current AIS position and an AIS position without the air conditioning engaged.

5. A method as set forth in claim 1 wherein the AIS position target is the difference between the current relative AIS position with the air conditioning ON and an AIS position with the air conditioning OFF.

6. A method as set forth in claim 1 wherein said step of updating the second point and the third point comprises:

accumulating a second weight and accumulating a third weight;

determining if the weighted relative AIS position is greater than the AIS position target;

determining if the accumulated second weight minus the second weight is an integer if the weighted relative AIS position is greater than the AIS position target;

decrementing the second point if the accumulated second weight minus the second weight is an integer;

determining if the accumulated third weight minus the third weight is an integer;

decrementing the third point if the accumulated third weight minus the third weight is an integer;

determining if the accumulated second weight plus the second weight is an integer if the weighted relative AIS position is less than the AIS position target;

incrementing the second point if the accumulated second weight plus the second weight is an integer;

determining if the accumulated third weight plus the third weight is an integer;

incrementing the third point if the accumulated third weight plus the third weight is an integer.

7. A method of adaptive air conditioning compensation for a motor vehicle having an air conditioning (AC) system with a compressor, an automatic idle speed (AIS) compensation mechanism having an AIS position, and an engine control mechanism, said method comprising the steps of:

comparing a head pressure on the compressor to a predetermined continuous curve of relative AIS position and identifying a first point on the curve of relative AIS position associated with the head pressure;

identifying a second point and a third point on the curve of relative AIS position that the first point is between;

weighting the second point with respect to the first point and weighting the third point with respect to the first point;

interpolating the curve of relative AIS position using the weighted second point and the weighted third point to obtain a weighted relative AIS position;

determining if the weighted relative AIS position is equal to an AIS position target;

adaptively updating the second point and the third point on the curve of relative AIS position if the weighted relative AIS position is not equal to an AIS position target by accumulating a second weight and accumulating a third weight;

determining if the weighted relative AIS position is greater than the AIS position target;

determining if either the accumulated second weight minus the second weight, or the accumulated third weight minus the third weight, is an integer if the weighted relative AIS position is greater than the AIS position target;

decrementing the second point or the third point respectively if the accumulated second weight minus the second weight or the accumulated third weight minus the third weight is an integer;

determining if either the accumulated second weight plus the second weight, or the accumulated third weight plus the third weight, is an integer if the weighted relative AIS position is less than the AIS position target;

incrementing the second point or the third point respectively if the accumulated second weight plus the second weight, or the accumulated third weight plus the third weight is an integer; and adjusting the AIS compensation mechanism based upon the weighted relative AIS position when called for by the engine control mechanism.

\* \* \* \* \*